(12) United States Patent
Tauschinsky et al.

(10) Patent No.: US 10,749,881 B2
(45) Date of Patent: Aug. 18, 2020

(54) COMPARING UNSUPERVISED ALGORITHMS FOR ANOMALY DETECTION

(71) Applicant: SAP SE, Walldorf (DE)

(72) Inventors: Atreju Florian Tauschinsky, Walldorf (DE); Robert Meusel, Mannheim (DE); Oliver Frendo, Heidelberg (DE)

(73) Assignee: SAP SE, Walldorf (DE)

( * ) Notice: Subject to any disclaimer, the term of this patent is extended or adjusted under 35 U.S.C. 154(b) by 301 days.

(21) Appl. No.: 15/637,471

(22) Filed: Jun. 29, 2017

(65) Prior Publication Data
US 2019/0007432 A1 Jan. 3, 2019

(51) Int. Cl.
| | | |
|---|---|---|
| *G06F 11/00* | (2006.01) | |
| *G06F 12/14* | (2006.01) | |
| *G06F 12/16* | (2006.01) | |
| *G08B 23/00* | (2006.01) | |
| *H04L 29/06* | (2006.01) | |
| *G06F 17/18* | (2006.01) | |
| *G06F 9/06* | (2006.01) | |
| *G06F 16/2457* | (2019.01) | |
| *G06K 9/62* | (2006.01) | |
| *G06F 21/55* | (2013.01) | |

(52) U.S. Cl.
CPC .......... *H04L 63/1425* (2013.01); *G06F 9/06* (2013.01); *G06F 16/24578* (2019.01); *G06F 17/18* (2013.01); *G06F 21/552* (2013.01); *G06K 9/6215* (2013.01); *G06K 9/6277* (2013.01)

(58) Field of Classification Search
CPC . H04L 63/1425; G06F 16/24578; G06F 9/06; G06F 17/18; G06F 21/50
See application file for complete search history.

(56) References Cited

U.S. PATENT DOCUMENTS

| | | | |
|---|---|---|---|
| 8,660,868 | B2 | 2/2014 | Vogel et al. |
| 9,306,966 | B2 * | 4/2016 | Eskin ...................... G06F 16/84 |
| 10,200,262 | B1 * | 2/2019 | Leverich ............. H04L 43/0823 |
| 2010/0179930 | A1 | 7/2010 | Teller et al. |
| 2011/0078106 | A1 * | 3/2011 | Luchi .................. G06F 11/3452 |
| | | | 706/48 |
| 2013/0079938 | A1 | 3/2013 | Lee et al. |
| 2013/0110761 | A1 * | 5/2013 | Viswanathan ......... G06N 20/00 |
| | | | 706/52 |
| 2014/0200952 | A1 | 7/2014 | Hampapur et al. |
| 2014/0365191 | A1 | 12/2014 | Zyglowicz et al. |

(Continued)

OTHER PUBLICATIONS

Non-final office action issued in U.S. Appl. No. 15/633,401 dated Jan. 9, 2020, 23 pages.

*Primary Examiner* — John B King
*Assistant Examiner* — Darshan I Dhruv
(74) *Attorney, Agent, or Firm* — Fish & Richardson P.C.

(57) ABSTRACT

Methods, systems, and computer-readable storage media for ranking anomaly detection algorithms, including operations of receiving a set of unlabeled data from one or more sensors in a plurality of sensors of an internet of things, generating a plurality of data distributions corresponding to the set of unlabeled data by using a plurality of anomaly detection algorithms, and ranking the plurality of anomaly detection algorithms relative to the set of unlabeled data based on a distance between a first quantile and a second quantile of each of the plurality of data distributions.

20 Claims, 6 Drawing Sheets

(56) References Cited

U.S. PATENT DOCUMENTS

| | | | |
|---|---|---|---|
| 2015/0058982 A1* | 2/2015 | Eskin | H04L 63/1425 |
| | | | 726/23 |
| 2015/0178865 A1 | 6/2015 | Anderson et al. | |
| 2016/0217384 A1* | 7/2016 | Leonard | G06N 5/02 |
| 2016/0350671 A1 | 12/2016 | Morris et al. | |
| 2017/0011382 A1* | 1/2017 | Zoldi | G06Q 20/3827 |
| 2017/0228660 A1* | 8/2017 | Kutzkov | G06N 20/00 |
| 2017/0230392 A1* | 8/2017 | Dean | H04L 63/1425 |
| 2018/0047071 A1* | 2/2018 | Hsu | G06Q 30/0282 |
| 2018/0096261 A1* | 4/2018 | Chu | G06N 20/00 |
| 2018/0211176 A1* | 7/2018 | Khurshudov | H04W 4/70 |
| 2018/0241762 A1* | 8/2018 | Savalle | H04L 63/1458 |
| 2018/0247220 A1* | 8/2018 | Assem Aly Salama | |
| | | | G06N 20/00 |
| 2018/0248905 A1* | 8/2018 | Cote | G06K 9/6269 |
| 2018/0374104 A1 | 12/2018 | Meusel et al. | |
| 2019/0012351 A1* | 1/2019 | Maor | G06F 16/288 |

\* cited by examiner

US 10,749,881 B2

COMPARING UNSUPERVISED ALGORITHMS FOR ANOMALY DETECTION

BACKGROUND

The Internet of Things (IoT) is a network of physical objects, or "things," embedded within electronics, software, sensors, and connectivity to enable and achieve greater value and service by exchanging data with the manufacturer, operator, and/or other connected devices or systems. The IoT provides application gateways for data aggregation and distribution that are located between application servers and numerous devices. Because the data amount in the IoT is very large and unlabeled, it can be difficult to determine data that is anomalous.

SUMMARY

Implementations of the present disclosure include computer-implemented methods for ranking anomaly detection algorithms. In some implementations, actions include receiving a set of unlabeled data from one or more sensors in a plurality of sensors of an internet of things, generating a plurality of data distributions corresponding to the set of unlabeled data by using a plurality of anomaly detection algorithms, and ranking the plurality of anomaly detection algorithms relative to the set of unlabeled data based on a distance between a first quantile and a second quantile of each of the plurality of data distributions. Other implementations of this aspect include corresponding systems, apparatus, and computer programs, configured to perform the actions of the methods, encoded on computer storage devices.

These and other implementations can each optionally include one or more of the following features: actions further include processing the set of unlabeled data to determine a set of univariate scores for each of the plurality of anomaly detection algorithms; actions further include normalizing the set of univariate scores for each of the plurality of anomaly detection algorithms; the second quantile can be based on the first quantile and a parameter, wherein the parameter is based on a width of a respective data distribution; the first quantile and the second quantile can be above 0.95; and actions further include comparing an anomaly score corresponding to a first ranked anomaly detection algorithm of the plurality of anomaly detection algorithms to an alert threshold.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to ranking anomaly detection algorithms. More particularly, implementations of the present disclosure are directed to identifying best matching algorithm for differentiating anomalies in IoT data. In the context of the IoT, cloud platforms can store large amounts of unlabeled measurement data from numerous sensors. The IoT data can then be used to remotely control and manage the corresponding devices and/or to trigger object-related processes. Unlabeled IoT data can include normal and abnormal data that are not differentiated by any labels. IoT data anomalies are different from normal IoT with respect to their features and are rare (e.g., less than 50%) in a dataset compared to normal instances. IoT data anomalies could affect associated IoT processes. Detection and removal of data anomalies can improve IoT processes.

Implementations can include actions of receiving a set of unlabeled data from one or more sensors in a plurality of sensors of an internet of things, generating a plurality of data distributions corresponding to the set of unlabeled data by using a plurality of anomaly detection algorithms, and ranking the plurality of anomaly detection algorithms relative to the set of unlabeled data based on a distance between a first quantile and a second quantile of each of the plurality of data distributions.

Figure 1:
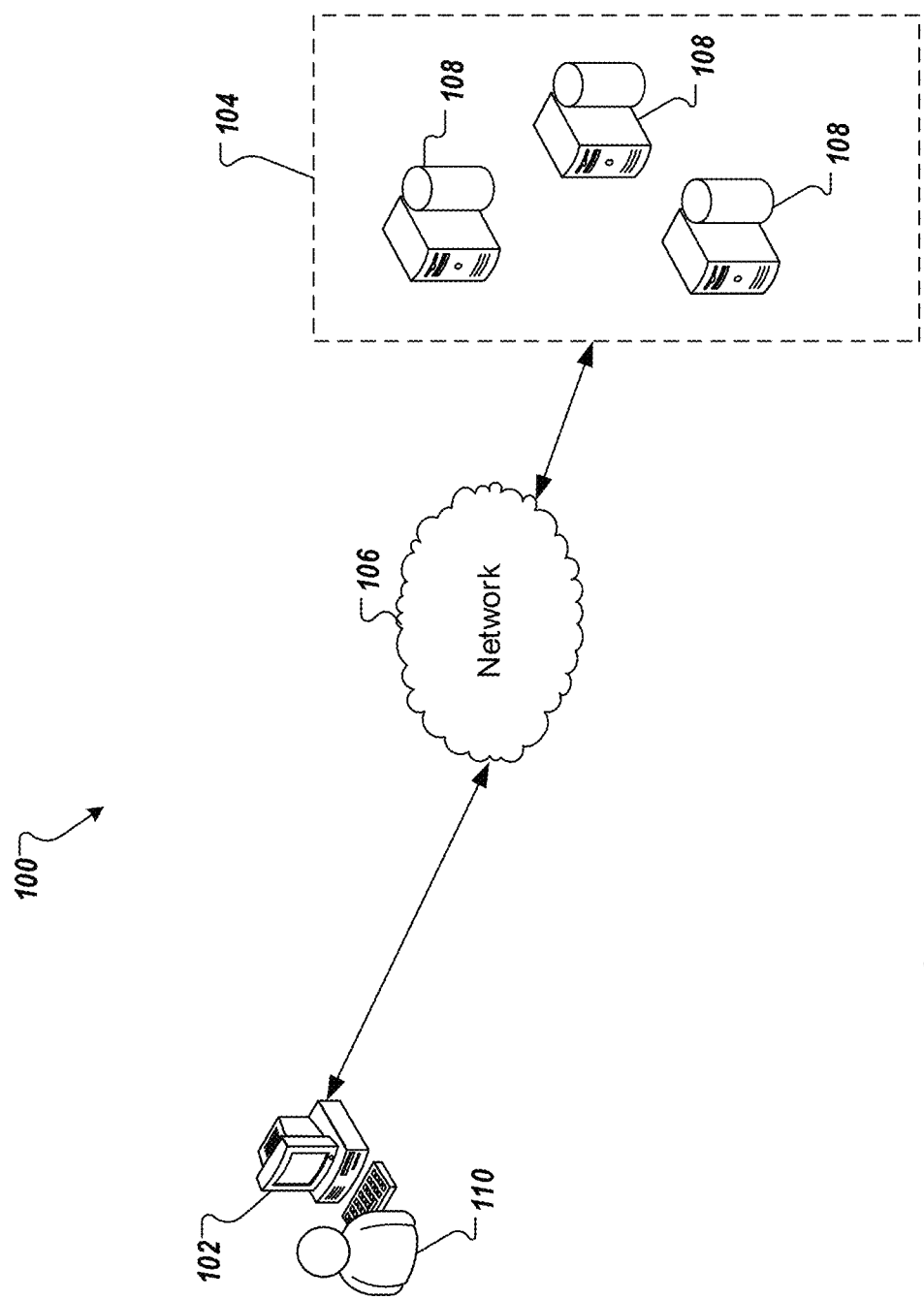
FIG. 1 depicts an example architecture that can be used to execute implementations of the present disclosure.

FIG. 1 depicts an example architecture 100 that can be used to execute implementations of the present disclosure. In the depicted example, the example architecture 100 includes one or more client devices 102, a server system 104 and a network 106. The server system 104 includes one or more server devices 108. In the depicted example, a user 110 interacts with the client device 102. In an example context, the user 110 can include a user, who interacts with an application that is hosted by the server system 104, such as an application for ranking anomaly detection algorithms.

In some examples, the client device 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to an IoT server, a web server, an application server, a proxy server, a network server, and/or a server pool. In general, server systems accept requests for application services and provides such services to any number of client devices (e.g., the client device 102) over the network 106.

In accordance with implementations of the present disclosure, the server system 104 can be an IoT system configured to host a service for ranking anomaly detection algorithms (e.g., provided as one or more computer-executable programs executed by one or more computing devices). For example, input data can be provided to the server system 104 (e.g., from an IoT device), and the server system can process the input data through the service for ranking anomaly detection algorithms and provide result data. For example, the server system 104 can send the result data to the client device 102 over the network 106 for display to the user 110.

Implementations of the present disclosure are described in detail herein with reference to an example context. The example context includes ranking anomaly detection algorithms for IoT data. Example IoT data can include a metric that represents a series of values recorded by a sensor. For example, metrics can include acoustical, optical, thermal, electrical, mechanical, chemical, biological, positional information and other various information that can be measured by sensors. The IoT data can include unlabeled data, such that anomalies in the data are not flagged or differentiated in any way from normal data before being processed with anomaly detection algorithms.

Anomaly detection algorithms can include statistical methods for monitoring dissimilarities between current and past sensor values of the recorded metrics to identify data anomalies. Some anomaly detection algorithms can be better than others depending on one or more characteristics of the datasets, such as the distribution of anomalies within the dataset. Ranking of anomaly detection algorithms can be applied to each dataset to identify the best anomaly detection algorithm for a particular time interval. For example, a first anomaly detection algorithm can be the best in identifying anomalies of a dataset measured by a sensor during a first time interval and a second anomaly detection algorithm, different from the first anomaly detection algorithm, can be the best in identifying anomalies of a dataset measured by the same sensor during a second time interval.

In some implementations, the data amount in the IoT can be very large and the data is processed such that only a section of the metrics is analyzed by anomaly detection algorithms at a time. For example, metrics can be filtered based on one or more rules or truncated to a particular size based on a time interval. All the recorded metrics or a portion of the metrics (e.g., corresponding to a particular time interval) can be processed by multiple anomaly detection algorithms. The anomaly detection algorithms include statistical functions, such as principal component analysis (PCA)-based approaches, linear regression, neural network approaches and others.

The data is displayed by anomaly detection algorithms as histograms that include quantile plots. A portion of the quantiles can be selected to rank the anomaly detection algorithms. For typical IoT anomaly detection workloads the portion of the quantiles can be between approximately 0.97 and 0.999 in steps of 0.001. In some implementations user 110 can modify the quantile range for one or more sensors. For example, the users 110 can modify the quantile range based on knowledge about the expected anomaly rate, which can improve the performance of ranking the anomaly detection algorithms.

The anomaly detection algorithms can be ranked using a cross-validation based approach or a distribution-based approach. The cross-validation based approach includes determining a k-fold cross validation on data, a regression analysis and a classification analysis. The regression analysis includes normalizing the scores using a hard box or quantiles as threshold and calculating the proportion of variance in data for each point relative to the total variance. The classification analysis includes using results from the algorithm trained on a fold as reference value for each fold, calculating discrete scores based on a selected threshold, and determining a classification matrix and a derived quantity per matrix.

The distribution based approach is based on the assumption that algorithms that produce score distributions that are bi-modal or fat tailed are better. Bi-modal distributions can be classified based on the value of the ratios. For example, a normal/anomaly ratio of approximately 50/50 can be classified as bad (or unrealistic) and larger rations, such as 90/10 can be classified as good (or realistic). The distribution based approach can be configured to consider only unilateral tails (e.g., higher quantile tails).

The distribution based approach can include a quantification method. The quantification method can include one or more criteria or a combination of the criteria. For example, the quantification method can include a differentiation between one-sided and bi-modal distribution, an identification of benchmark anomalies and a clustering method. The identification of benchmark anomalies can include determining the distance between a first quantile and a second quantile. In some implementations, the first quantile and the second quantile can be provided by the user 110 or can be set to a reasonable range of quantiles (e.g., 0.95 and 0.99).

The identification of benchmark anomalies can be based on one of the three quality measures $M_1$, $M_2$, and $M_3$.

The method based on quality measure $M_1$ determines the distance between a first quantile, q and a second quantile, q−ε, that makes results constant for uniform distributions. $M_1$ can be defined by:

$M_1 = \max_{q \in Q}(\text{quantile}(s_A, q) - \text{quantile}(s_A, q-\varepsilon))$, where ε could be a free parameter in the order of $1e^{-3}$ and $s_A$ represents the set of normalized scores from the interval [0, 1] for a particular algorithm.

For example, when looking at quantile 0.99, the quantification score (e.g., quality metric) is the distance, in score space, between the score corresponding to quantile 0.99 and the score corresponding to quantile 0.98=0.99−ε.

The method based on quality measure $M_2$ determines the distance between a first quantile, q and a second quantile, q−ε, and weights the results by number of scores s bigger than quantile q. $M_2$ can be defined by:

$$M_2 = \max_{q \in Q}((\text{quantile}(s_A, q) - \text{quantile}(s_A, q-\varepsilon))*\text{count}(s > q))$$

For example, when looking at quantile 0.99, the distance between quantile 0.99 and quantile 0.98 is calculated in score space, and the result is weighted by the number of scores bigger than 0.99.

The method based on quality measure $M_3$ determines how far to find same number as scores as in an interval above current point. $M_3$ can be defined by:

$$M_3 = \max_{q \in Q}(s_0 - \text{quantile}(s_A, q - N/s_A))),$$ where σ can be determined from the standard deviation of $s_A$ or pre-determined by the user and $s_0$ and N are defined as:

$$s_0 = \text{quantile}(s_A, q) \text{ and } N = \text{count}(s_A > s_0; s_A < s_0 + \sigma)$$

For example, when looking at quantile 0.99, it is determined how many scores are in an interval $s_{99} < \text{score} < s_{99} + \sigma$. The score $s_{99}$, corresponding to the $99^{th}$ quantile, can be determined from quantile(scores, 0.99). The parameter σ is a free parameter that can be set automatically based on width of distribution. It is determined how far to go in score space to find as many measurements with a score lower than score s99 based on the selected interval.

Figure 2:
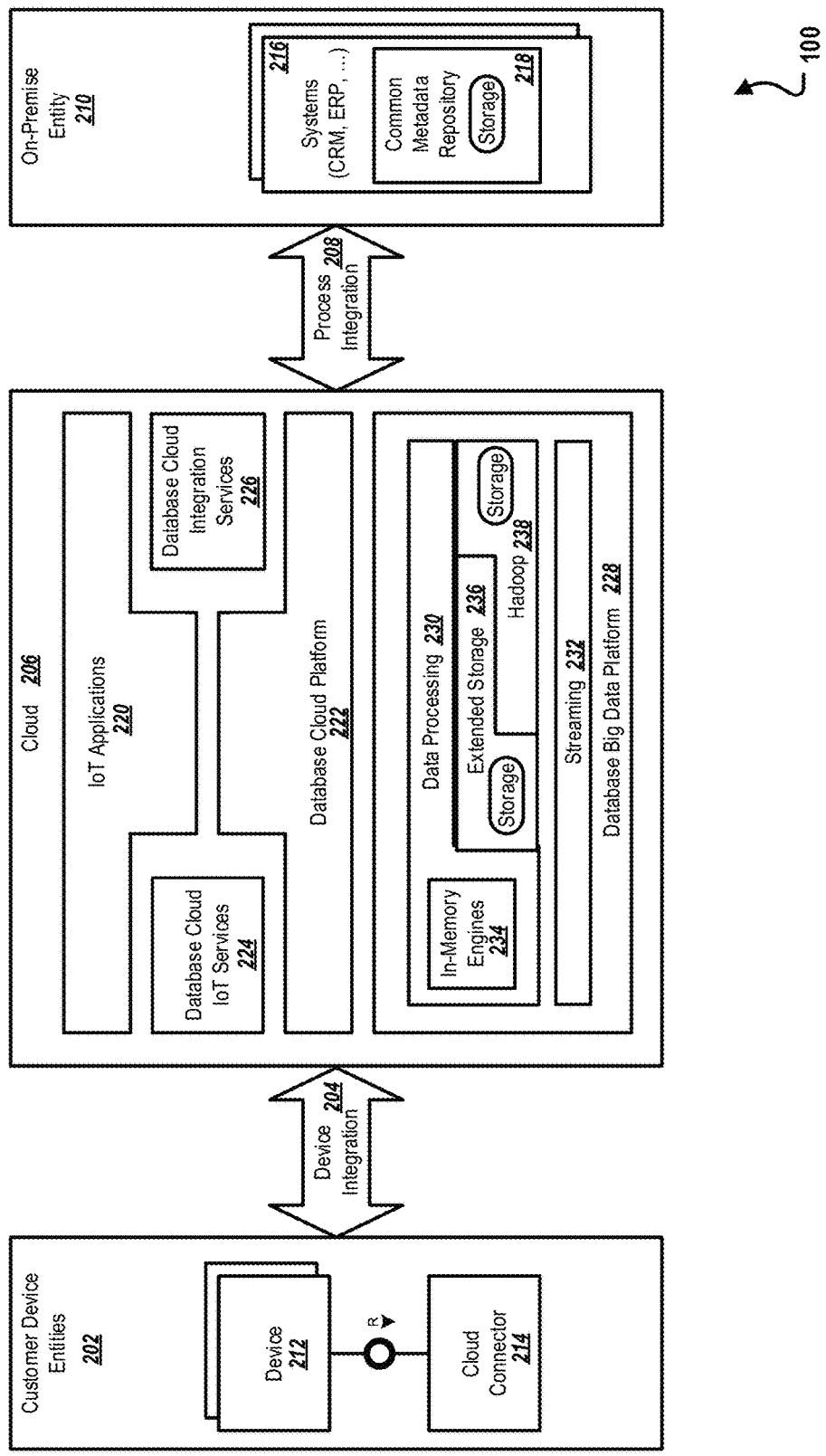
FIG. 2 depicts an example architecture that can be used to execute implementations of the present disclosure.

FIG. 2 is a block diagram illustrating an example cloud IoT platform 200 for ranking anomaly detection algorithms. The example IoT platform 200 can be a cloud IoT platform, configured to collect data from numerous devices and sensors, to perform anomaly detection algorithms on the collected data, to process the data based on the results of the anomaly detection algorithms and to store the data in the cloud (e.g., scalable server system).

The system 200 can include one or more customer device entities 202, a device integration component 204, a cloud 206, a process integration component 208, and on premise entity 210. Each customer device entity 202 includes a device 212 and a cloud connector 214. The device 212 can be a physical object including, or attached to one or more sensors. The sensors can be a part of the device 212 or external objects that use the device 212 as a hub. A metric can represent a series of values recorded by a sensor. For example, metrics can include temperature, humidity, wind, speed, geographic coordinates, sound, etc. The data transmitted by the customer device entities 202 to the cloud 206 can include the metrics. The cloud connector 214 can integrate the device 212 to the cloud 206 using the device integration component 204. The cloud 206 supports process integration 208 of processes associated with the devices 204 with an on premise entity 210 that includes systems 216 and a common metadata repository 218.

The cloud 206 includes IoT applications 220. The IoT applications 220 can be executed on a database cloud platform 222. The IoT applications 220 can use database cloud IoT services 224 to communicate with the devices 204, and can use database cloud integration services 226 to communicate with the on premise entities 210. The IoT applications 220 can include an application for ranking anomaly detection algorithms that can be used to process the data received from devices 204.

The cloud 206 includes a database big data platform 228 that can serve as a platform for the IoT applications 220 and includes a data processing component 230 and a streaming component 232. The data processing component 230 can include in-memory engines 234 for executing instructions, an extended storage component 236 for storing data, and a Hadoop framework 238 that supports distributed storage and data processing. The results generated by the cloud 206 can be transmitted to the on premise entity 210 using the process integration component 208. The on premise entity 210 can include a plurality of systems 216 that are associated to a common metadata repository 218. The common metadata repository 218 can be based on a meta-model that supports visualization of results generated by ranking anomaly detection algorithms for one or more data sets.

Figure 3A:
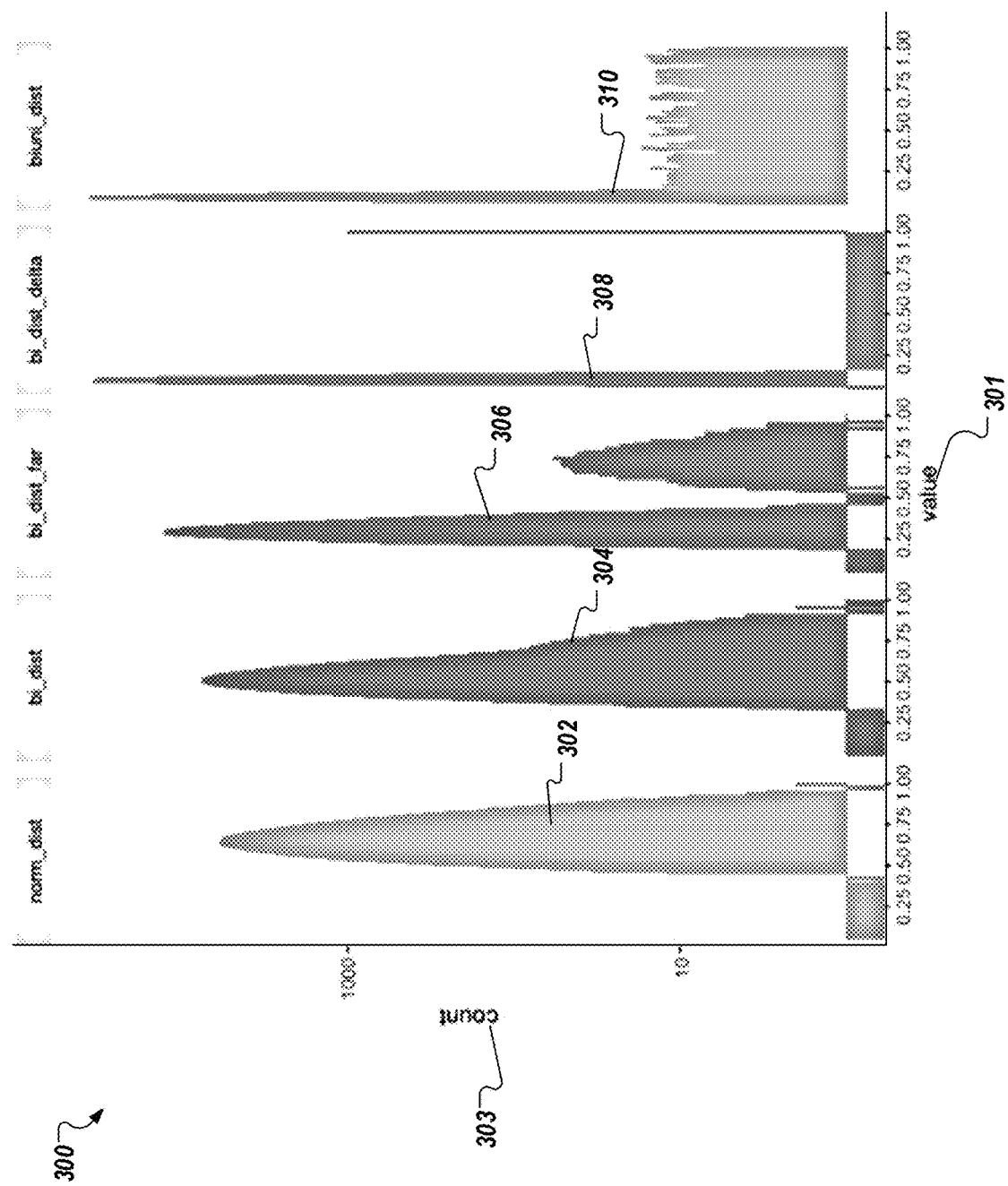
FIGS. 3A and 3B depict an example graphical representations in accordance with implementations of the present disclosure.

FIG. 3A depicts an example of a graphical representation 300 of a step of ranking anomaly detection algorithms for a single dataset. The data set can include a metric recorded by an IoT device, as described with reference to FIGS. 1 and 2. The graphical representation 300 includes multiple examples of statistical distributions 302, 304, 306, 308, 310.

The examples of statistical distributions 302, 304, 306, 308, 310 can be histograms associated to a plurality of anomaly detection algorithms that display the single dataset as value 301 per count (or density) 303. Some examples of anomaly detection algorithms include principal component analysis (PCA)-based approaches, linear regression, neural network approaches and others.

The histograms can include quantile plots. The quantile includes a portion of the dataset such that each portion contains the same amount of data. In the example of FIG. 3A, the quantiles correspond to percentiles, such that the dataset is displayed as a histogram formed of 100 parts of equal size. The anomalies are expected to be in the tail region of the examples of statistical distributions 302, 304, 306, 308, 310. The examples of statistical distributions 302, 304, 306, 308, 310 illustrated in FIG. 3A indicate that some statistical methods are better than others at differentiating normal data from anomalies. For example, statistical distribution 302 identifies a minimal portion of the data as potentially being abnormal and has a short tail. Statistical distribution 304 has a longer tail than statistical distribution 302, indicating a larger portion of the data as potentially being abnormal, which is normal-distributed. As another example, statistical distributions 306 and 308 are bi-modal. The example statistical distribution 306 illustrates the anomalies as being normally distributed. The example statistical distribution 308 identifies a large majority of anomalies as having a constant value. The example statistical distribution 310 identifies the anomalies as being uniformly distributed.

Figure 3B:
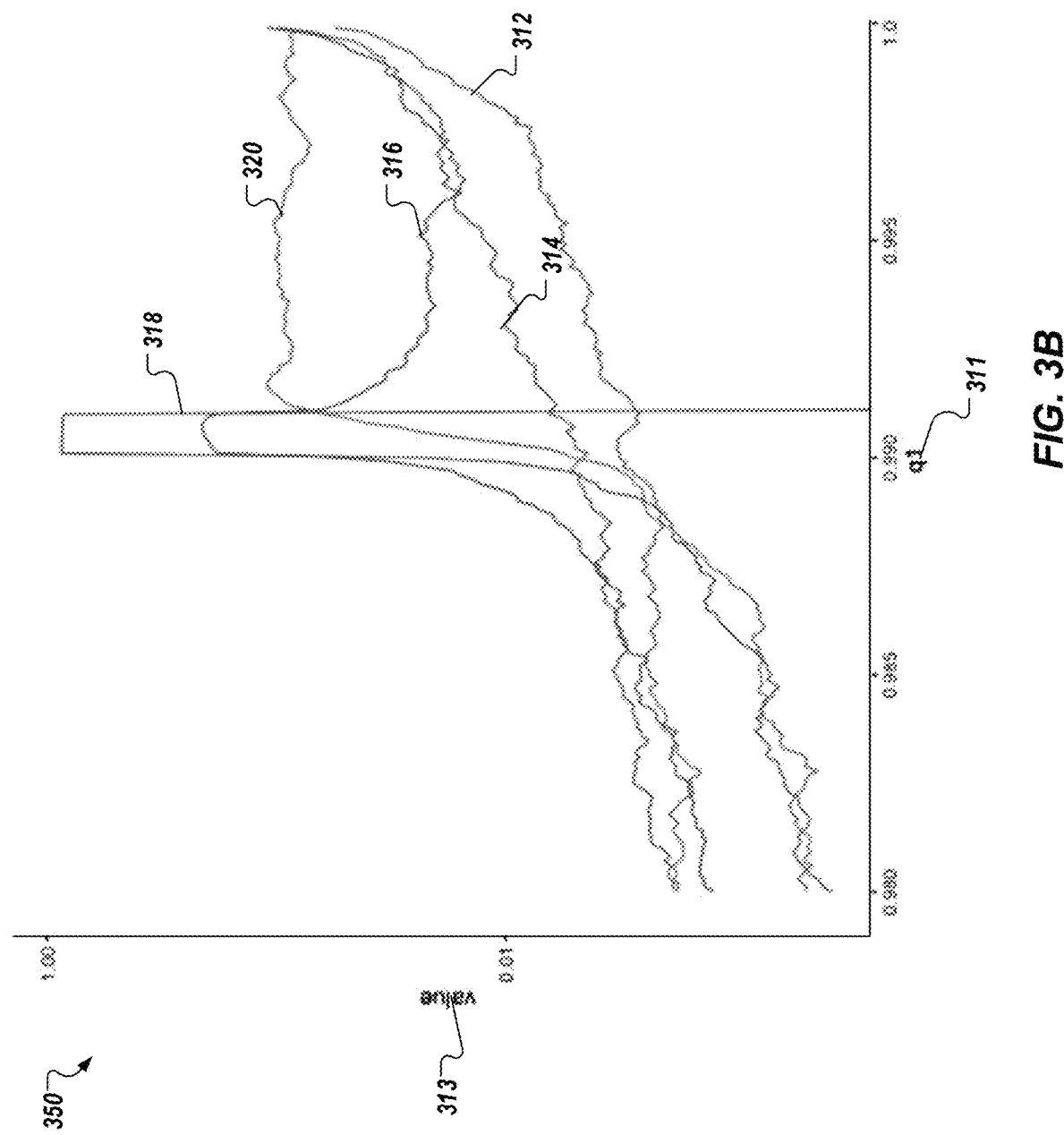

FIG. 3B depicts an example of a graphical representation 350 of another step of ranking anomaly detection algorithms for a single dataset. The data set corresponds to the dataset used for the graphical representation 300, as described with reference to FIG. 3A. The graphical representation 350 includes multiple examples of quantifications of statistical distributions 312, 314, 316, 318, 320.

The examples of quantifications of statistical distributions 312, 314, 316, 318, 320 illustrate a plurality of anomaly scores 313 within a quantile interval 311 for previously determined statistical distributions, such as example statistical distributions 302, 304, 306, 308, 310 described with reference to FIG. 3A. The anomaly scores 313 can be determined using any of the measures $M_1$, $M_2$, and $M_3$ described with reference to FIG. 1. The quantifications of statistical distributions 312, 314, 316, 318, 320 can be compared between each other to identify best anomaly detection algorithm for the analyzed dataset according to one or more classification criteria.

According to one classification criterion, the higher the overall quantification scores, the better the anomaly detection algorithm. In the illustrated example of FIG. 3B, the quantification of statistical distributions 312 and 314 present similar profiles. Quantitative comparison between the quantification of statistical distributions 312 and 314 indicates that statistical distribution 314 is better at identifying anomalies than statistical distribution 312. In particular, the average, the maximum, and/or total value of the quantification of statistical distribution 314 is higher than the average, the maximum, and/or total value of the quantification of statistical distribution 312.

According to one classification criterion, the higher differentiation between anomalies and normal data points in a dataset, the better anomaly detection algorithm. Differentiation can be defined by assigning high scores to the first group and comparable low scores to the latter group. In the illustrated example of FIG. 3B, the quantifications of statistical distributions 316 and 318 each include a peak, which indicates that the statistical distributions 316 and 318 are better than statistical distributions 312 and 314. The quantification of statistical distribution 318 includes the highest peak, which indicates that statistical distribution 318 is the best anomaly detection algorithm from the analyzed statistical distributions for the selected dataset.

Figure 4:
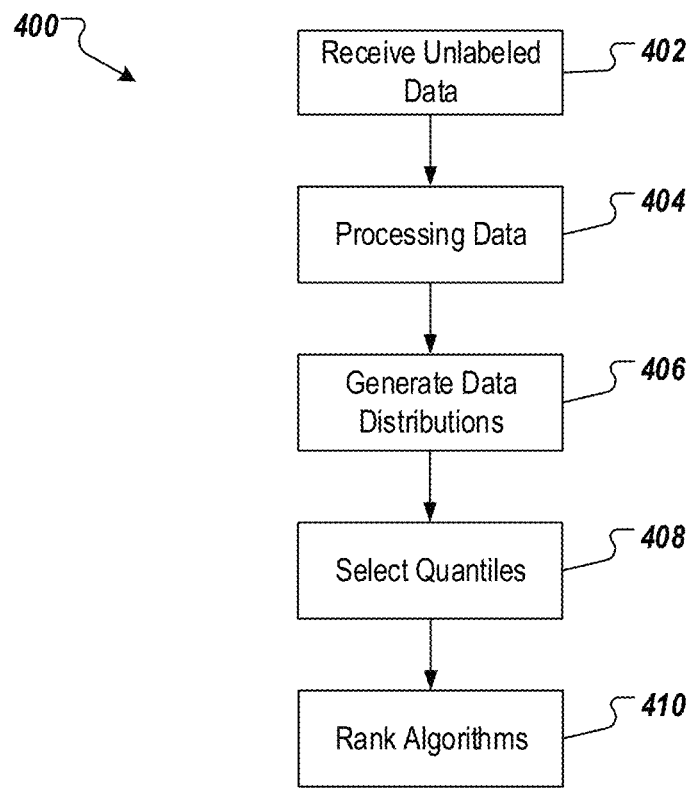
FIG. 4 depicts an example process that can be executed in accordance with implementations of the present disclosure.

FIG. 4 depicts an example process 400 that can be provided by one or more computer-executable programs executed using one or more computing devices, as described with reference to FIGS. 1-3. In some implementations, the example process 400 is executed to rank anomaly detection algorithms in accordance with implementations of the present disclosure. In some implementations, the process 400 can be based on a distribution-based approach, which is based on the assumption that anomaly detection algorithms that produce score distributions that are bi-modal/fat tailed are 'better.'

A set of unlabeled data is received by one or more processors from one or more sensors in a plurality of sensors of an internet of things (IoT) (402). The plurality of sensors can include a part of an IoT device or external objects attached to an IoT device. The data can be multi-variate (e.g., multiple different sensors can be used by an anomaly detection algorithm to determine anomaly scores). The data can include a metric, such as a series of values recorded by the sensor. The metrics can include incoming/outgoing data volume, temperature, humidity, wind, speed, geographic coordinates, sound, or any other values reflecting a functionality of an IoT device.

The metrics are processed by a variety of anomaly detection algorithms (404). Examples of anomaly detection algorithms include principal component analysis (PCA)-based approaches, linear regression, neural network approaches and others. The processing can include using the anomaly detection algorithms to calculate scores from the sensor data. Per anomaly detection algorithm, metric processing results in one set of univariate scores. The scores can be normalized using normalization constants so that normalized scores of all anomaly detection algorithms are within preselected intervals (e.g., interval [0, 1]). Normalization constants may be calibrated for each sensor in the modeling stage or for a combination of sensors.

A plurality of data distributions corresponding to the set of unlabeled data is generated by using a plurality of anomaly detection algorithms (406). For example, normalized data can be used to generate the data distributions. Data distributions can be based on anomaly detection algorithms configured to illustrate dissimilarities in recorded sensor values to identify data anomalies. The data distributions can be displayed as histograms that include quantile plots. The distance between the quantiles can be selected in steps of predefined size (e.g., 0.001) that are constant between the anomaly detection algorithms.

A first quantile and a second quantile of each of the plurality of data distributions are selected to determine a distance between them (408). In some implementations, the one or more processors can receive an input from a user indicating the first quantile and the second quantile for one or more sensors. For example, users can modify the distance based on knowledge about the expected anomaly rate, which can improve the performance of ranking the anomaly detection algorithms. In some implementations, the one or more processors can retrieve the selection of the first quantile and the second quantile from a database. The first quantile and the second quantile can be selected based on one or more conditions. One condition can include a requirement for the first quantile and the second quantile to be above a preset threshold (e.g., 0.95). For example, the first quantile can be approximately 0.97 and the second quantile can be approximately 0.999. The distance between the first quantile and the second quantile can be calculated by defining the second quantile as the first quantile and a parameter, where the parameter indicates the width of the respective data distribution.

The anomaly detection algorithms are ranked to determine how suitable each of the anomaly detection algorithms is for detecting anomalies in the data set (410). The anomaly detection algorithms can be ranked based on comparing the distances between the first quantile and the second quantile of the anomaly detection algorithms. For example, the best (first ranked) anomaly detection algorithm corresponds to the largest distance between the first quantile and the second quantile and the worse anomaly detection algorithm corresponds to the smallest distance between the first quantile and the second quantile.

In some implementations, the process 400 can include determining an anomaly score for the first ranked anomaly detection algorithm of the plurality of anomaly detection algorithms. The anomaly score can include an amount of data identified as being anomalous by the first ranked anomaly detection algorithm. The process 400 can include comparing the anomaly score to an alert threshold. If the maximum anomaly score exceeds the alert threshold, an alert can be generated indicating the anomaly and the associated IoT device. In some implementations, the process 400 can include removing the data anomaly based on the anomaly identification of the best anomaly detection algorithm before transmitting the data within the IoT domain for remotely controlling and managing the corresponding devices and/or to trigger object-related processes. In some implementations, the process 400 can include updating a setting (e.g., software component) of a device and/or upgrading (e.g., replacing) an element (e.g., hardware component) of the device that generated data anomaly to prevent future anomalies. Process 400 can be repeated for each data type (corresponding to each sensor) at particular time intervals considering that an anomaly detection algorithm identified as the best match for a data set can be different from the best match for another data set (e.g., a data set measured at a different time or by a different sensor).

In some implementations, the process 400 can be based on a cross-validation based approach. The cross-validation based approach includes determining a k-fold cross validation on data, a regression analysis and a classification analysis. The regression analysis includes normalizing the scores using a hard box or quantiles as threshold and calculating the proportion of variance in data for each point relative to the total variance. The classification analysis includes using results from the algorithm trained on a fold as reference value for each fold, calculating discrete scores based on a selected threshold, and determining a classification matrix and a derived quantity per matrix.

Implementations of the present disclosure provide one or more of the following example advantages. Methods for anomaly detection, particularly in the IoT space can use un-labelled data. The use of un-labelled data makes it very difficult to compare the performance of different algorithms on a given dataset, and consequently, to choose the most suitable algorithm from a set of possible methods. Ranking anomaly detection algorithms for IoT data can provide an "automated mode" to identify a best matching anomaly detection algorithm for a particular data set. Automatic identification of the best anomaly detection algorithm could eliminate manual data analysis for anomaly detection. An IoT analytics platform based on open source software may be designed to greatly minimize the complexities of ingesting and processing massive amounts of data generated in IoT scenarios. Detection and removal of data anomalies can improve IoT processes and the functionality of one or more IoT devices that can depend on the received data.

Figure 5:
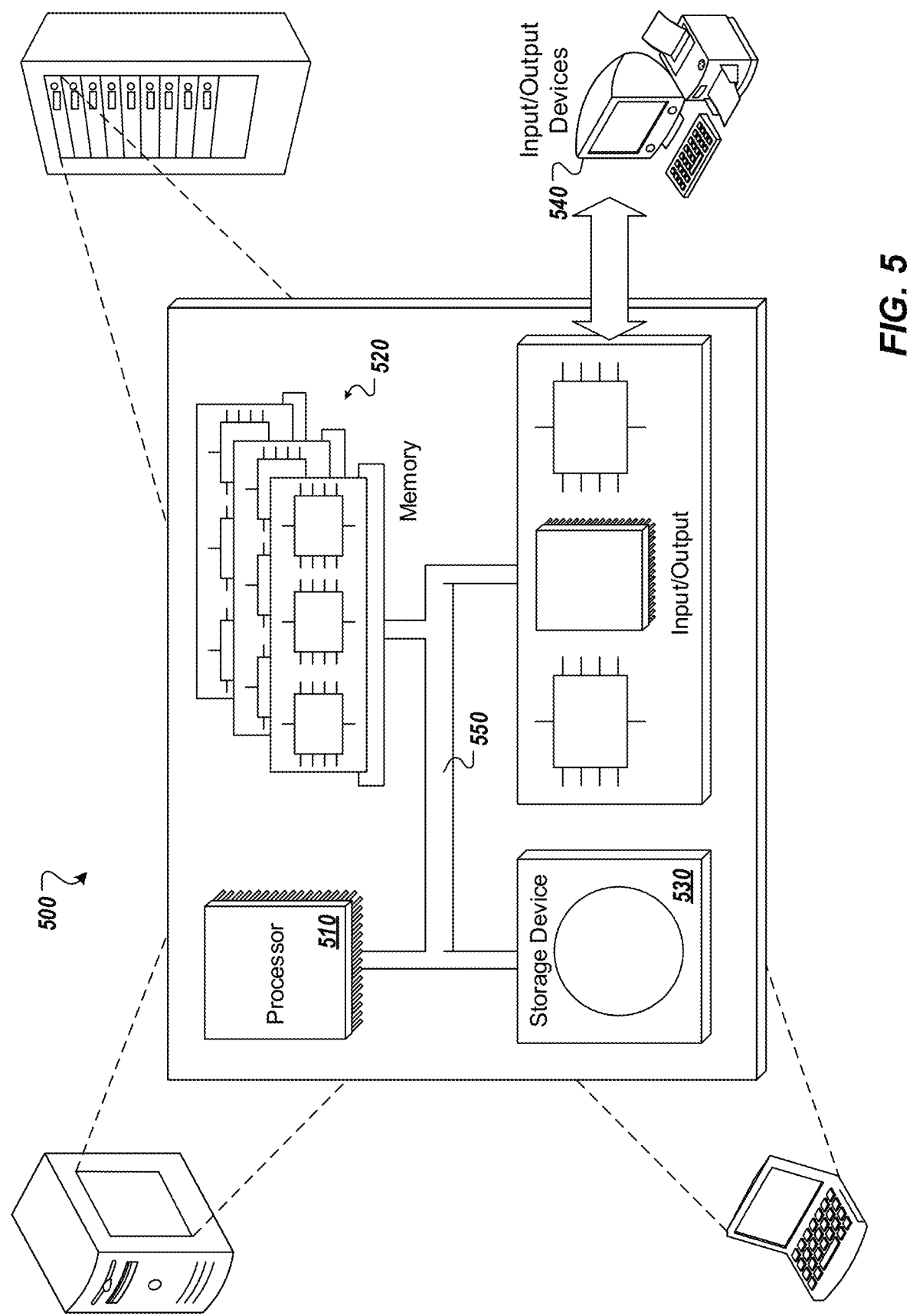
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for ranking anomaly detection algorithms, the method being executed by one or more processors and comprising:
receiving, by the one or more processors, a set of unlabeled data from one or more sensors in a plurality of sensors of an internet of things, the set of unlabeled data comprising anomalies that are undifferentiated from normal data before being processed by any one of a plurality of anomaly detection algorithms;
generating, by the one or more processors, a plurality of data distributions corresponding to the set of unlabeled data by using the plurality of anomaly detection algorithms;
ranking, by the one or more processors, the plurality of anomaly detection algorithms relative to the set of unlabeled data based on a distance between a first quantile and a second quantile of each of the plurality of data distributions, wherein a higher ranking anomaly detection algorithm provides a first differentiation between the anomalies and the normal data in the set of unlabeled data that is higher than a second differentiation between the anomalies and the normal data in the set of unlabeled data provided by a lower ranking anomaly detection algorithm; and
triggering, by the one or more processors, a modification of a setting of a system from where the anomalies were generated to correct the anomalies detected by the higher ranking anomaly detection algorithm.

2. The method of claim 1, further comprising processing the set of unlabeled data to determine a set of univariate scores for each of the plurality of anomaly detection algorithms.

3. The method of claim 2, further comprising normalizing the set of univariate scores for each of the plurality of anomaly detection algorithms.

4. The method of claim 1, wherein the second quantile is based on the first quantile and a parameter.

5. The method of claim 4, wherein the parameter is based on a width of a respective data distribution.

6. The method of claim 1, wherein the first quantile and the second quantile are above 0.95.

7. The method of claim 1, further comprising comparing an anomaly score corresponding to a first ranked anomaly detection algorithm of the plurality of anomaly detection algorithms to an alert threshold.

8. A non-transitory computer-readable storage medium coupled to one or more processors and having instructions stored thereon which, when executed by the one or more processors, cause the one or more processors to perform operations for ranking anomaly detection algorithms, the operations comprising:
receiving a set of unlabeled data from one or more sensors in a plurality of sensors of an internet of things, the set of unlabeled data comprising anomalies that are undifferentiated from normal data before being processed by any one of a plurality of anomaly detection algorithms;
generating a plurality of data distributions corresponding to the set of unlabeled data by using the plurality of anomaly detection algorithms;
ranking the plurality of anomaly detection algorithms relative to the set of unlabeled data based on a distance between a first quantile and a second quantile of each of the plurality of data distributions, wherein a higher ranking anomaly detection algorithm provides a first differentiation between the anomalies and the normal data in the set of unlabeled data that is higher than a second differentiation between the anomalies and the normal data in the set of unlabeled data provided by a lower ranking anomaly detection algorithm; and
triggering a modification of a setting of a system from where the anomalies were generated to correct the anomalies detected by the higher ranking anomaly detection algorithm.

9. The non-transitory computer-readable storage medium of claim 8, further comprising processing the set of unlabeled data to determine a set of univariate scores for each of the plurality of anomaly detection algorithms.

10. The non-transitory computer-readable storage medium of claim 9, further comprising normalizing the set of univariate scores for each of the plurality of anomaly detection algorithms.

11. The non-transitory computer-readable storage medium of claim 8, wherein the second quantile is based on the first quantile and a parameter.

12. The non-transitory computer-readable storage medium of claim 11, wherein the parameter is based on a width of a respective data distribution.

13. The non-transitory computer-readable storage medium of claim 8, wherein the first quantile and the second quantile are above 0.95.

14. The non-transitory computer-readable storage medium of claim 8, further comprising comparing an anomaly score corresponding to a first ranked anomaly detection algorithm of the plurality of anomaly detection algorithms to an alert threshold.

15. A system, comprising:
a computing device; and
a computer-readable storage device coupled to the computing device and having instructions stored thereon which, when executed by the computing device, cause the computing device to perform operations for ranking anomaly detection algorithms, the operations comprising:
receiving a set of unlabeled data from one or more sensors in a plurality of sensors of an internet of things, the set of unlabeled data comprising anomalies that are undifferentiated from normal data before being processed by any one of a plurality of anomaly detection algorithms;
generating a plurality of data distributions corresponding to the set of unlabeled data by using the plurality of anomaly detection algorithms;
ranking the plurality of anomaly detection algorithms relative to the set of unlabeled data based on a distance between a first quantile and a second quantile of each of the plurality of data distributions, wherein a higher ranking anomaly detection algorithm provides a first differentiation between the anomalies and the normal data in the set of unlabeled data that is higher than a second differentiation between the anomalies and the normal data in the set of unlabeled data provided by a lower ranking anomaly detection algorithm; and
triggering a modification of a setting of a system from where the anomalies were generated to correct the anomalies detected by the higher ranking anomaly detection algorithm.

16. The system of claim 15, further comprising processing the set of unlabeled data to determine a set of univariate scores for each of the plurality of anomaly detection algorithms.

17. The system of claim 16, further comprising normalizing the set of univariate scores for each of the plurality of anomaly detection algorithms.

18. The system of claim 15, wherein the second quantile is based on the first quantile and a parameter.

19. The system of claim 18, wherein the parameter is based on a width of a respective data distribution.

20. The system of claim 15, wherein the first quantile and the second quantile are above 0.95.

* * * * *